Nov. 10, 1964 E. F. COLBERT 3,156,324

SPEED REGULATING ATTACHMENT FOR TAPE RECORDERS

Filed Dec. 27, 1962

INVENTOR.
Earl F. Colbert

BY Lawrence L. Colbert

ATTORNEY

United States Patent Office 3,156,324
Patented Nov. 10, 1964

3,156,324
SPEED REGULATING ATTACHMENT FOR TAPE RECORDERS
Earl F. Colbert, 21 Curtis St., Worcester, Mass.
Filed Dec. 27, 1962, Ser. No. 247,680
1 Claim. (Cl. 188—80)

This invention relates to apparatus for the regulation of speed, more particularly this invention relates to attachment devices for tape recorders and the like for regulating or governing the speed of the turntable or rotary member turning the tape reel.

It is an object of the invention to provide a novel reel speed controller which may be readily attached to a tape recorder to govern the speed of the turntable in winding or unwinding of the tape onto a reel.

It is a further object of the invention to provide a novel attachment for governing the speed of a drive which may be adjustable to vary the governing rate.

It is a further object of the invention to provide a novel drive controller which may be inexpensively produced and rapidly assembled.

Further objects and advantages of the speed controller invention will become apparent as the description proceeds and when taken in conjunction with the accompanying drawings, wherein:

FIGURE 2 is a top plan view of the speed controller invention prior to its installation upon a tape recorder or the like.

Briefly stated, the invention includes a speed controller mounting bracket having an arm and projecting roller at one end and the outer end of the arm which is rotatably mounted thereon, the roller is adapted to be urged against the rim of a turntable to provide a drag or load upon the turntable and control the rate of rotation of the turntable, with the arm being an elongated resilient metal plate flexed by an adjustment knob, to provide the spring biasing or urging of the roller against the rim.

Figure 1:
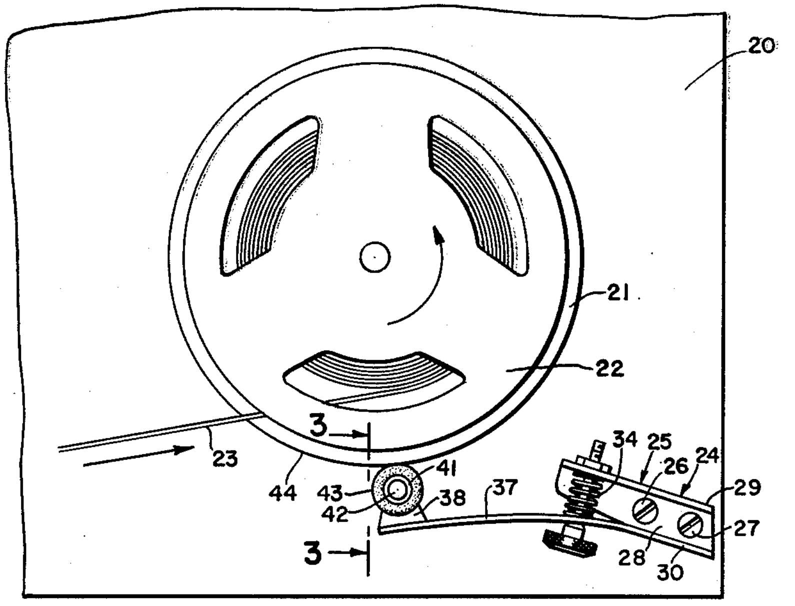
FIGURE 1 is a top plan view of the speed controller invention installed upon the deck of a conventional tape recorder with the control roller in operative position.
Figure 3:
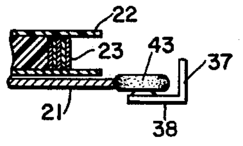
FIGURE 3 is a cross-sectional view of the invention taken along line 3—3 of FIGURE 1.

Referring more particularly to the drawings, FIGURE 1 discloses a conventional tape recorder deck 20 having a turntable 21 with a conventional tape reel 22 mounted thereon, and is shown winding magnetic tape 23 onto the tape reel 22.

Mounted to the deck 20 is the speed controller device 24 which has a bracket 25 with two screws 26 and 27. The bracket 25 has a base 28 and a pair of side flanges 29 and 30 formed integrally with the base 28.

Each of the vertical side flanges 29 and 30 has an aperture 31 and 31' for receiving a threaded rod 32 which has a knurled knob 33 fixed to the end of the rod 32. A metal coil spring 34 is mounted on the rod 32. A threaded nut member 35 is threaded onto the outer end of the rod 32. The spring 34 is used to hold the setting of the rod 32 and also to keep the flanges separated.

The vertical side flange 30 has a vertical flat elongated metal plate extension arm portion 37 or spring extension strap portion formed integrally with the side flange portion 30 and projects outwardly and parallel to the tape deck and generally tangential to the turntable. At the outer free end of the extension arm 37 is a forward horizontal base portion 38 which is formed integrally with the extension arm and projects horizontally. A pin 39 is fixed to the base 38 and projects upward and a frusto-conical roller support 40 is fixed to the upper face of the base with the pin 39 passing therethrough. A wheel 41 is rotatably mounted to the pin 39 and held in place by the head 42 of the pin 39, and an annular O-ring 43 is mounted onto the wheel 41 to provide the roller.

The speed control device is installed with the O-ring roller 43 engaging the turntable. The force of engagement may be varied by adjusting the adjustment knob. This adjustment is accomplished by grasping the nut member 35 and holding it stationary while at the same time turning the adjustment knob to thread the rod portion into the nut member further which moves the adjustment knob toward the flange 29. This draws the intermediate portion 37' of the extension arm 37 toward the flange 29. The extension arm being made of resilient metal, in being drawn toward the flange 29 urges the O-ring 43 against the rim of the turntable with greater pressure. The roller provided by the wheel and O-ring will continue to roll with the rim as the rim rotates, the O-ring will be flattened against the rim to a greater extent as a result of the adjustment and create a greater drag upon the rim causing it to rotate slower. Conversely, the adjustment knob can be turned in the opposite direction, causing the knob to be moved away from the flange 29, by the unthreading, and then will be less spring pressure by the extension arm and thus less drag upon the turntable, and the rotational speed of the turntable may thus be increased.

Thus by threading the knob toward the nut member, a greater drag can be placed on the rim and, conversely, by adjusting the knob away from the nut member, less drag is placed on the rim, and thereby the speed of the rim may be varied by the adjustment knob.

The nut member 35 may be welded to the bracket if desired or the aperture 30 may be tapped to threadably receive the rod 32, and in such case the nut member may be dispensed with.

Figure 2:
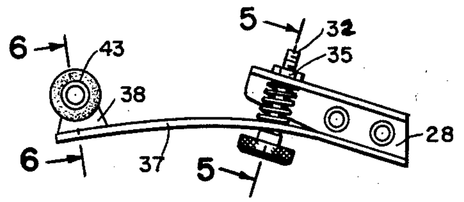
Figure 4:
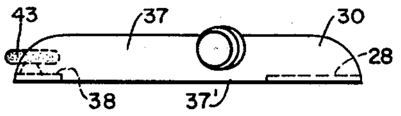
FIGURE 4 is a side elevational view of the speed controller invention.
Figure 5:
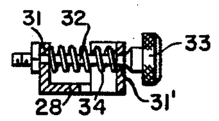
FIGURE 5 is a cross-sectional view of the speed controller taken along line 5—5 of FIGURE 2 revealing the mounting construction of the control adjustment knob for the speed controller invention.
Figure 6:
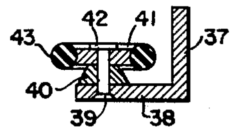
FIGURE 6 is a cross-sectional view of the rubber roller and its mounting taken along line 6—6 of FIGURE 2.
Figure 7:
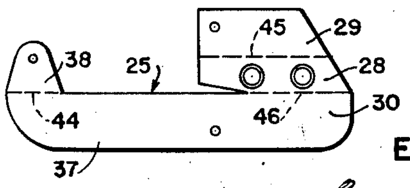
FIGURE 7 is a plan view of the plate or bracket prior to folding and assembly.

In FIG. 7, the bracket 25 is illustrated after having been cut out of a single piece of sheet metal and holes provided for the screws, adjustment knob, and roller assembly. The bracket 25 is folded along lines 44, 45 and 46 into the shape illustrated in FIG. 2, for example, with the exception that the arm portion 37 would not be flexed into a curve as shown in FIG. 2, but would extend along a relatively straight line. After the folding operation, the roller assembly is attached, and the knob adjustment components are installed.

It will be obvious that various changes and departures may be made in the invention without departing from the spirit and scope thereof and, accordingly, it is not intended that the invention be limited to that specifically disclosed in the drawings or described in the specification but only as set forth in the appended claim.

What is claimed is:

In combination with a tape recorder including a deck, a tape reel rotatably mounted in a horizontal plane on said deck and means for rotating said reel, a speed control device for said reel comprising a substantially U-shaped bracket including a short vertical side flange, an elongated resilient vertical side flange, and a base, screw means securing said base to said deck, said elongated flange including a resilient extension arm which projects beyond said base to a point adjacent said reel, said resilient arm being cut away from said base adjacent said extension arm, a horizontal base portion on the free end of said extension arm, a vertical pin carried by said base portion, a roller rotatably mounted on said pin, a resilient O-ring on said roller engaging said tape reel, said elongated flange having an opening therein adjacent the cut away portion, and said short vertical side flange having an opening therein aligned with the opening in said elongated flange, a bolt extending through said aligned openings, a knurled head on said bolt on the outer side of said elongated flange, a nut rotatable on the other end of said bolt on the outer side of said short flange, and a compression spring surrounding said bolt between said flanges, whereby rotation of said knurled head varies the compression of said spring to vary the pressure exerted by said O-ring on said tape reel.

References Cited in the file of this patent

UNITED STATES PATENTS

| | | |
|---|---|---|
| 849,302 | Whelchel | Apr. 2, 1907 |
| 938,814 | Bogue | Nov. 2, 1909 |
| 2,123,936 | Dreyfus et al. | July 19, 1938 |